(12) United States Patent
Goleski et al.

(10) Patent No.: US 9,157,511 B2
(45) Date of Patent: *Oct. 13, 2015

(54) MULTI-SPEED TRANSMISSION

(71) Applicant: Ford Global Technologies, LLC

(72) Inventors: Gregory Daniel Goleski, Rochester Hills, MI (US); Reid Alan Baldwin, Howell, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 105 days.

This patent is subject to a terminal disclaimer.

(21) Appl. No.: 14/039,455

(22) Filed: Sep. 27, 2013

(65) Prior Publication Data

US 2014/0024488 A1 Jan. 23, 2014

Related U.S. Application Data

(63) Continuation-in-part of application No. 13/480,960, filed on May 25, 2012, now Pat. No. 8,545,362.

(51) Int. Cl.
 *F16H 3/62* (2006.01)
 *F16H 3/66* (2006.01)
(52) U.S. Cl.
 CPC .. *F16H 3/62* (2013.01); *F16H 3/66* (2013.01); *F16H 2200/0069* (2013.01); *F16H 2200/2012* (2013.01); *F16H 2200/2043* (2013.01); *F16H 2200/2046* (2013.01); *F16H 2200/2084* (2013.01); *F16H 2200/2094* (2013.01)

(58) Field of Classification Search
 CPC .............. F16H 3/62; F16H 2200/2012; F16H 2200/2064; F16H 2200/2069; F16H 2200/2084; F16H 2200/2094
 USPC .................................. 475/277, 282, 283, 288
 See application file for complete search history.

(56) References Cited

U.S. PATENT DOCUMENTS

| | | | |
|---|---|---|---|
| 6,053,839 A | 4/2000 | Baldwin et al. | |
| 7,789,792 B2 | 9/2010 | Kamm et al. | |
| 8,007,394 B2 | 8/2011 | Phillips et al. | |
| 8,016,708 B2 | 9/2011 | Diosi et al. | |
| 8,231,495 B2 | 7/2012 | Gumpoltsberger et al. | |
| 8,251,855 B2* | 8/2012 | Diosi et al. | 475/277 |
| 8,303,455 B2 | 11/2012 | Gumpoltsberger et al. | |
| 8,545,362 B1* | 10/2013 | Goleski et al. | 475/277 |
| 8,556,765 B2 | 10/2013 | Bockenstette et al. | |
| 2004/0121877 A1* | 6/2004 | Lee et al. | 475/282 |
| 2009/0088289 A1* | 4/2009 | Baldwin | 475/276 |

(Continued)

OTHER PUBLICATIONS

H. Benford, M. Leising, The Lever Analogy: A New Tool in Transmission Analysis, 1982, Society of Automotive Engineers, Inc. 810102, p. 429-437.

*Primary Examiner* — Edwin A Young
(74) *Attorney, Agent, or Firm* — James Dottavio; Brooks Kushman P.C.

(57) ABSTRACT

A transmission gearing arrangements produces up to ten forward and one reverse speed ratios by selective engagement of various combinations of four shift elements. Each disclosed transmission includes four planetary gear sets and at least six shift elements. One of the shift elements may be a dog clutch. Optional passive one way brakes simplify the control.

25 Claims, 4 Drawing Sheets

(56) References Cited

U.S. PATENT DOCUMENTS

| | | |
|---|---|---|
| 2010/0234167 A1 | 9/2010 | Lee et al. |
| 2011/0294617 A1 | 12/2011 | Seo et al. |
| 2012/0053008 A1 | 3/2012 | Beck et al. |
| 2013/0150201 A1 | 6/2013 | Knox et al. |
| 2013/0345014 A1 | 12/2013 | Mellet et al. |
| 2014/0100073 A1 | 4/2014 | Lee |
| 2014/0106923 A1 | 4/2014 | Burgerson et al. |
| 2014/0106925 A1 | 4/2014 | Mellet et al. |

\* cited by examiner

FIG. 1

| Ring 28 / Sun 26 | 2.20 |
|---|---|
| Ring 38 / Sun 36 | 1.75 |
| Ring 48 / Sun 46 | 1.60 |
| Ring 58 / Sun 56 | 3.70 |

FIG. 2

| | 66/78 | 68/80 | 70 | 74 | 76 | Ratio | Step |
|---|---|---|---|---|---|---|---|
| Rev | X | X | | X | | -4.79 | 102% |
| 1st | X | X | X | | | 4.70 | |
| 2nd | X | X | | | X | 2.99 | 1.57 |
| 3rd | X | | X | | X | 2.18 | 1.37 |
| 4th | X | | | X | X | 1.80 | 1.21 |
| 5th | X | | X | X | | 1.29 | 1.38 |
| 6th | | | X | X | X | 1.00 | 1.29 |
| 7th | | X | | X | | 0.85 | 1.17 |
| 8th | | X | | X | X | 0.64 | 1.34 |

| | 66/78 | 68/80 | 70 | 72 | 74 | 76 | Ratio | Step |
|---|---|---|---|---|---|---|---|---|
| Rev | X | X | | X | X | | -4.79 | 102% |
| 1st | X | X | X | (X) | | | 4.70 | |
| 2nd | X | X | | X | | X | 2.99 | 1.57 |
| 3rd | X | | X | X | | X | 2.18 | 1.37 |
| 4th | X | | | X | X | X | 1.80 | 1.21 |
| 5th | X | | X | | X | X | 1.54 | 1.17 |
| 6th | X | | X | X | X | | 1.29 | 1.19 |
| 7th | | | X | X | X | X | 1.00 | 1.29 |
| 8th | | X | X | X | X | | 0.85 | 1.17 |
| 9th | | X | | | X | X | 0.69 | 1.24 |
| 10th | | X | | X | X | X | 0.64 | 1.08 |

FIG. 5

MULTI-SPEED TRANSMISSION

CROSS-REFERENCE TO RELATED APPLICATIONS

This application is a continuation-in-part of U.S. application Ser. No. 13/480,960 filed May 25, 2012, now U.S. Pat. No. 8,545,362, the disclosure of which is hereby incorporated in its entirety by reference herein.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

Four gearing arrangements impose particular speed relationships among an input, and output, and first through fifth shafts. A first gearing arrangement fixedly imposes a linear speed relationship among the first shaft, the second shaft, and the third shaft. The first gearing arrangement may be, for example, a simple planetary gear set with the sun gear as the first shaft, the carrier as the second shaft, and the ring gear as the third shaft. A second gearing arrangement fixedly imposes a linear speed relationship among the first shaft, the input, and the fourth shaft. A third gearing arrangement selectively imposes a linear speed relationship among the fourth shaft, the second shaft, and the fifth shaft. The third gearing arrangement may be, for example, a simple planetary gear set with the sun gear as the fourth shaft, the ring gear as the fifth shaft, and the carrier selectively coupled to the second shaft. Alternatively, the third gearing arrangement may include an intermediate shaft, a simple planetary gear set with the sun gear as the fourth shaft and the ring gear as the fifth shaft, and clutches selectively coupling the intermediate shaft to carrier and to the second shaft. An additional clutch may couple the intermediate shaft to the fourth shaft. A fourth gearing arrangement fixedly imposes a linear speed relationship among the fifth shaft, the output, and the second shaft. A dog clutch selectively holds the third shaft against rotation. A brake selectively holds the first shaft against rotation. Finally, a clutch selectively couples the input to the fifth shaft.

In another embodiment, four gearing arrangements impose particular speed relationships among an input, and output, and first through sixth shafts. A first gearing arrangement fixedly imposes a linear speed relationship among the first shaft, the second shaft, and the third shaft. A second gearing arrangement fixedly imposes a linear speed relationship among the first shaft, the input, and the fourth shaft. A third gearing arrangement fixedly imposes a linear speed relationship among the fourth shaft, the sixth shaft, and the fifth shaft. A fourth gearing arrangement fixedly imposes a linear speed relationship among the fifth shaft, the output, and the second shaft. A positive engagement shift element selectively holds the third shaft against rotation. The positive engagement shift element may be, for example, a dog clutch. A brake selectively holds the first shaft against rotation. Finally, a clutch module selectively couples any combination of two of the second shaft, the fourth shaft, and the sixth shaft. The clutch module may be, for example, an intermediate shaft and three clutches, each clutch selectively coupling the intermediate shaft to one of the second shaft, the fourth shaft, and the sixth shaft, respectively.

Another embodiment includes four simple planetary gear sets with particular connections. The second sun gear is fixedly coupled to the first sun gear. The second carrier is fixedly coupled to the input. The third sun gear is fixedly coupled to the second ring gear. The fourth sun gear is fixedly coupled to the third ring gear. The fourth ring gear is fixedly coupled to the second carrier. An intermediate shaft is selectively coupled to the third carrier and selectively coupled to the combination of the first carrier and the fourth ring gear. A third clutch may selectively couple the intermediate shaft to the combination of the second ring gear and third sun gear. A fourth clutch may selectively couple the input to the combination of the third ring gear and fourth sun gear. A brake may selectively hold the first and second sun gears against rotation. The brake may optionally include a one way brake that passively prevents rotation in one direction. A positive engagement shift element may selectively hold the first ring gear against rotation. The positive engagement shift element may be, for example, a dog clutch. A second one way brake may passively prevent rotation of the first ring gear in one direction.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

A gearing arrangement is a collection of shafts and shift elements configured to impose specified speed relationships among the shafts. Some speed relationships, called fixed speed relationships, are imposed regardless of the state of any shift elements. Other speed relationships, called selective speed relationships, are imposed only when particular shift elements are fully engaged. The speed of a shaft is positive when the shaft rotates in one direction and negative when the shaft rotates in the opposite direction. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts, and iii) when the speeds of the shafts differ, they are constrained to be in the listed order, either increasing or decreasing.

Figure 1:
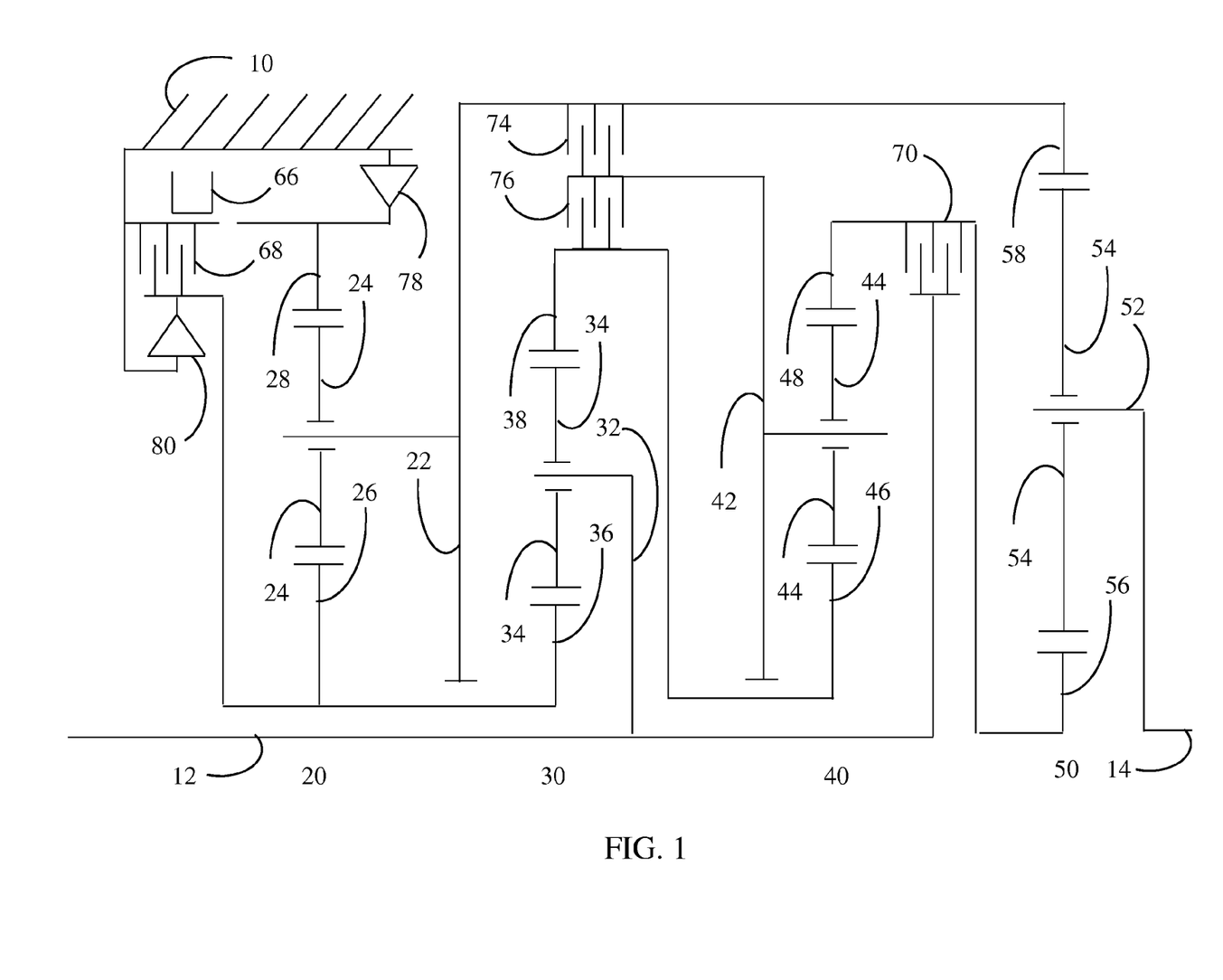
FIG. 1 is a schematic diagram of a first transmission gearing arrangement.

An example transmission is schematically illustrated in FIG. 1. Transmission housing 10 is fixedly mounted with respect to the vehicle. Input 12 is driven by the vehicle engine, preferably via a launch device such as a torque converter that permits the engine to idle while the input 12 is stationary. Output 14 drives the vehicle wheels, preferably via a differential which allows left and right wheels to rotate at slightly different speeds when the vehicle is turning.

The transmission utilizes four simple planetary gear sets 20, 30, 40, and 50. A planet carrier 22 rotates about the transmission axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the transmission axis. Gear sets 30, 40, and 50 are similarly structured. A suggested ratio of gear teeth for each planetary gear set is listed in FIG. 2.

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship between the sun gear, the ring gear, and the planet carrier.

Sun gear 26 is fixedly coupled to sun gear 36, carrier 22 is fixedly coupled to ring gear 58, ring gear 38 is fixedly coupled to sun gear 46, ring gear 48 is fixedly coupled to sun gear 56, input shaft 12 is fixedly coupled to carrier 32, and output shaft 14 is fixedly coupled to carrier 52.

Input shaft 12 is selectively coupled to ring gear 48 and sun gear 56 by clutch 70. Carrier 42 is selectively coupled to carrier 22 and ring gear 58 by clutch 74 and selectively coupled to ring gear 38 and sun gear 46 by clutch 76. Clutches 70, 74, and 76 may be hydraulically actuated multi-plate wet friction clutches. Hydraulic friction clutches include friction plates fixedly coupled to a first shaft intermeshed with separator plates fixedly coupled to a second shaft. When pressurized hydraulic fluid is routed to the clutch, a piston squeezes the friction plates against the separator plates selectively coupling the first shaft to the second shaft. When the hydraulic pressure is released, a return spring forces the piston away from the friction plates and separator plates such that they can rotate at different speeds relative to one another. An advantage of friction type clutches is that they shafts need not be at the same speed in order to engage the clutch. During engagement, friction brings the shafts to equal speed. A disadvantage of friction clutches is the separator plates and friction plates are still in close proximity when the clutch is released which may result in parasitic drag torque reducing the efficiency of the transmission.

Ring gear 28 is selectively held against rotation by dog clutch 66. Dog clutch 66 includes a sleeve configured to slide with respect transmission case 10 but rotationally fixed to transmission case 10. Teeth on the sleeve engage teeth on ring gear 28 when the sleeve is in one axial position holding ring gear 28 against rotation. When the sleeve is in an opposite axial position, ring gear 28 is free to rotate. The sleeve may be forced in one direction by a hydraulic piston and in the other direction by either a hydraulic piston or a spring. Dog clutches and other positive engagement shift elements such as synchronizers and selectable one way clutches are desirable because they exert very low parasitic drag when disengaged, relative to friction clutches. Unlike friction clutches, however, gradual engagement and disengagement of a dog clutch while the shafts have relative rotation is not feasible. Optional one way brake 78, if present, passively holds ring gear 28 against rotation in a reverse direction (opposite to the direction of engine rotation) while permitting rotation in a positive direction. If present, one way brake 78 simplifies engagement and disengagement of dog clutch 66 as discussed below. The design of a dog clutch and one way clutch combination is discussed in U.S. patent application Ser. No. 13/714,929. Alternatively, these shift elements may be replaced by a single friction brake, a controllable one way brake, or a combination of a friction brake and a one way brake.

Sun gears 26 and 36 are selectively held against rotation by brake 68 which may be a hydraulically actuated wet friction brake. Optional one way brake 80, if present, passively holds sun gears 26 and 36 against rotation in a reverse direction while permitting rotation in a positive direction. If present, one way brake 80 simplifies engagement and disengagement of brake 68 as discussed below.

Several combinations of components collectively impose particular speed relationships. Each planetary gear set imposes a fixed linear speed relationship as discussed above. The combination of gear set 40 and clutch 74 selectively imposes a linear speed relationship among sun gear 46, ring gear 58, and ring gear 48. The combination of gear set 40 and clutch 76 operatively couples ring gear 38 to sun gear 56.

Figure 2:
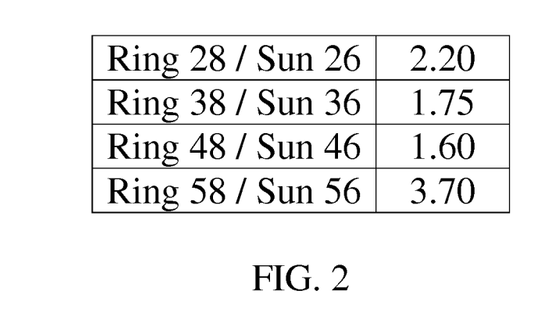
FIG. 2 is a table listing suggested tooth number ratios for the transmission gearing arrangement of FIG. 1.
Figure 3:
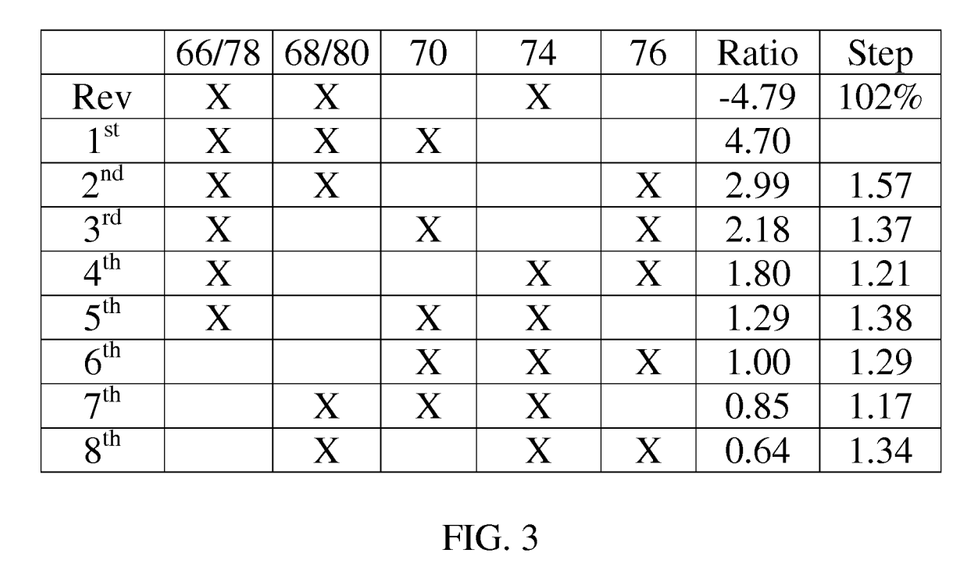
FIG. 3 is shift element application chart for the transmission gearing arrangement of FIG. 1.

As shown in FIG. 3, engaging the clutches and brakes in combinations of three establishes eight forward speed ratios and one reverse speed ratio between input shaft 12 and output shaft 14. An X indicates that the clutch is required to establish the speed ratio. When the gear sets have tooth numbers as indicated in FIG. 2, the speed ratios have the values indicated in FIG. 3.

The transmission is prepared for forward motion in 1st gear by engaging clutch 70. If optional one way brakes 78 and 80 are both present, they will passively engage to provide the reaction torque. Dog clutch 66 and brake 68 may optionally also be engaged. If optional one way brake 80 is not present, then friction brake 68 must be engaged. If optional one way brake 78 is not present, then dog clutch 66 must be engaged. It is preferable to engage dog clutch 66 before engaging clutch 70 because, if one way brake 78 is not present, ring gear 28 will begin rotating as soon as clutch 70 is engaged. While the vehicle is stationary, ring gear 28 can be stopped by engaging three friction elements.

Upon reaching a sufficient vehicle speed in 1st gear, the transmission is shifted into 2nd gear by gradually engaging clutch 76 and releasing clutch 70. Ideally, clutch 70 is released just as the torque capacity of clutch 76 reaches a level sufficient to transmit the input torque in 2nd gear. If clutch 70 is released prematurely, then output torque will drop more than necessary and the input speed will rise quickly. This is known as a flare condition. If, on the other hand, clutch 70 is released too late, output torque will drop more than necessary in what is called a tie-up condition. However, if one way brake 80 is present and brake 68 is released, then a tie-up condition will not reduce the output torque below the level associated with 3rd gear because one way brake 80 would begin to overrun at that point.

Upon reaching a sufficient vehicle speed in 2nd gear, the transmission is shifted into 3rd by gradually engaging clutch 70. If one way brake 80 is present, then brake 68 should be released before initiating the shift. One way brake 80 will passively disengage when clutch 70 reaches the proper torque capacity. If one way brake 80 is not present, then release of brake 68 must be coordinated with engagement of clutch 70. Shifting from 3rd to 4th is accomplished by the coordinated engagement of clutch 74 and release of clutch 70. Shifting from 4th to 5th is accomplished by the coordinated engagement of clutch 70 and release of clutch 76.

If one way brake 78 is present, then shifting from 5th to 6th is accomplished by first releasing dog clutch 66 and then gradually engaging clutch 76. One way brake 78 will passively release when clutch 76 reaches the proper torque capacity. If one way brake 78 is not present, then release of dog clutch 66 must be coordinated with engagement of clutch 76. When a dog clutch carries torque, the force between the dog teeth creates a frictional force resisting axial movement of the sleeve. If the dog teeth are not angled, then the force required to slide the dog clutch sleeve is proportional to the torque carried by the dog clutch. To release the dog clutch at the correct time, the axial force on the sleeve is set to a slight force pushing the dog clutch out of engagement. When torque capacity of clutch 76 reaches the correct level, the torque on the dog clutch drops to zero and the sleeve slides to the disengaged position. It is important that the rate of torque capacity increase of clutch 76 be low enough that the sleeve has time to slide completely into the disengaged position before the dog clutch begins carrying torque in the opposite direction. Shifting from 6th to 7th is accomplished by the coordinated engagement of clutch 80 and release of clutch 76. Finally, shifting from 7th to 8th is accomplished by the coordinated engagement of clutch 76 and release of clutch 70.

Most downshifts are accomplished by reversing the corresponding upshift. For example, downshifting from 8th gear to 7th gear is accomplished by the coordinated engagement of clutch 70 and release of clutch 76. Downshifting from 6th gear to 5th gear requires some special controls to ensure that ring gear 28 is substantially stationary when dog clutch 66 is engaged. If the shift takes place while power is flowing from the input to the output and one way brake 78 is present, then one way brake 78 will passively stop ring gear 28 as clutch 76 is released. If the shift takes place while power is flowing from the input to the output and one way brake 78 is not present, then clutch 76 may be actively controlled based on feedback signals from speed sensors to hold the speed of ring gear 28 near zero while dog clutch 66 is engaged. If power is flowing from the output to the input when the downshift is desired, then the transmission may be placed into neutral by releasing clutch 76 completely and engine power may be used to control the speed of ring gear 28. Once dog clutch 66 is engaged, power flow from the output to the input may resume.

The transmission is prepared for reverse motion by engaging dog clutch 66, brake 68, and clutch 74. It may be desirable to leave dog clutch 66 engaged whenever the vehicle is in park, neutral, reverse, or in drive at low vehicle speed in order to avoid the need to ensure that ring gear 28 is stopped before engaging the dog clutch.

Figure 4:
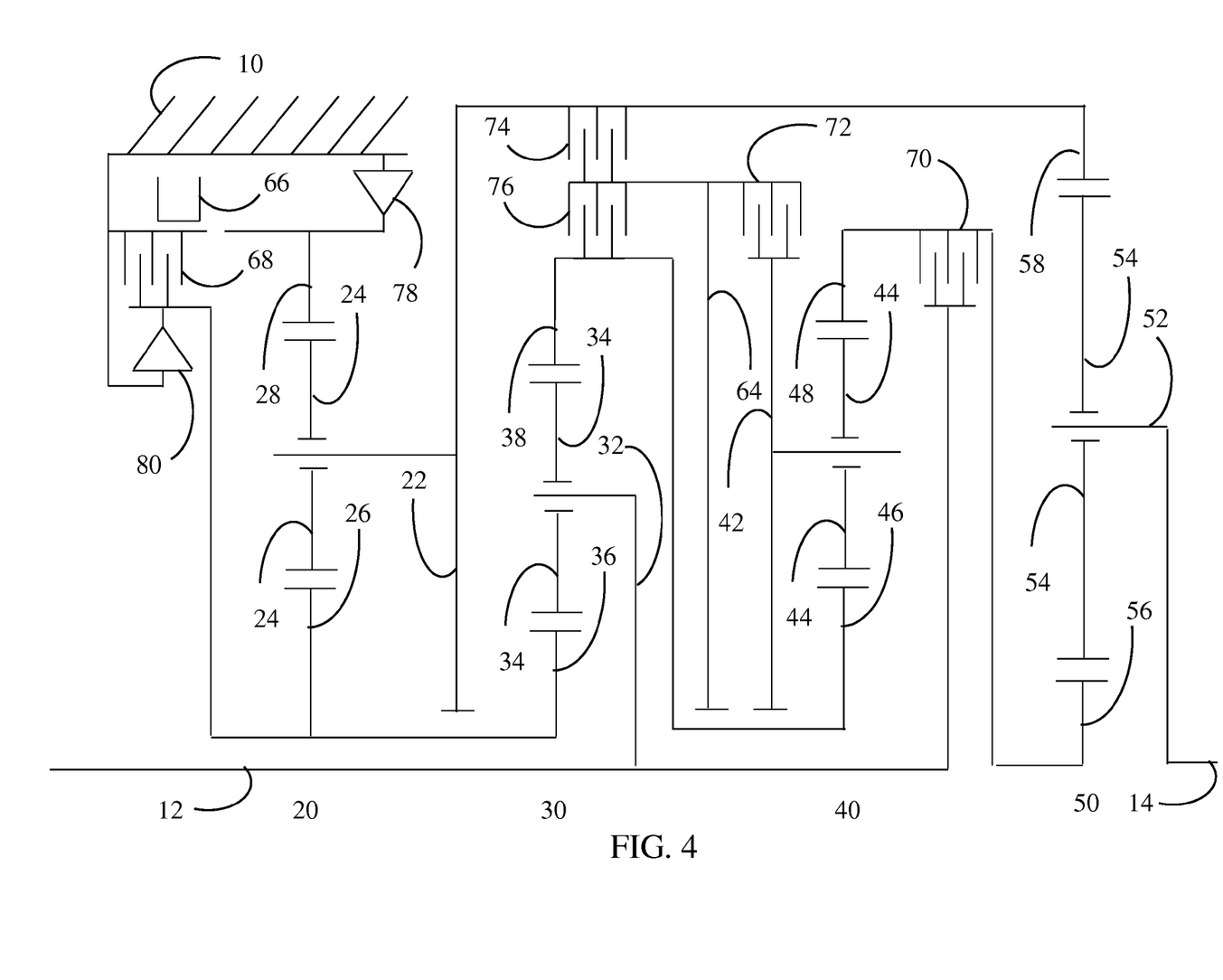
FIG. 4 is a schematic diagram of a second transmission gearing arrangement.

Another example transmission is schematically illustrated in FIG. 4. The transmission utilizes four simple planetary gear sets 20, 30, 40, and 50. A suggested ratio of gear teeth for each planetary gear set is listed in FIG. 2.

Sun gear 26 is fixedly coupled to sun gear 36, carrier 22 is fixedly couple to ring gear 58, ring gear 38 is fixedly coupled to sun gear 46, ring gear 48 is fixedly coupled to sun gear 56, input shaft 12 is fixedly coupled to carrier 32, and output shaft 14 is fixedly coupled to carrier 52.

Input shaft 12 is selectively coupled to ring gear 48 and sun gear 56 by clutch 70. Intermediate shaft 64 is selectively coupled to carrier 42 by clutch 72, selectively coupled to carrier 22 and ring gear 58 by clutch 74, and selectively coupled to ring gear 38 and sun gear 46 by clutch 76. Ring gear 28 is selectively held against rotation by dog clutch 66. Optional one way brake 78, if present, passively holds ring gear 28 against rotation in a reverse direction (opposite to the direction of engine rotation) while permitting rotation in a positive direction. Sun gears 26 and 36 are selectively held against rotation by brake 68. Optional one way brake 80, if present, passively holds sun gears 26 and 36 against rotation in a reverse direction while permitting rotation in a positive direction.

Several combinations of components collectively impose particular speed relationships. Each planetary gear set imposes a fixed linear speed relationship as discussed above. The combination of gear set 40, intermediate shaft 64, clutch 72, and clutch 74 selectively imposes a linear speed relationship among sun gear 46, ring gear 58, and ring gear 48. The combination of gear set 40, intermediate shaft 64, clutch 72, and clutch 76 operatively couples ring gear 38 to sun gear 56.

Figure 5:
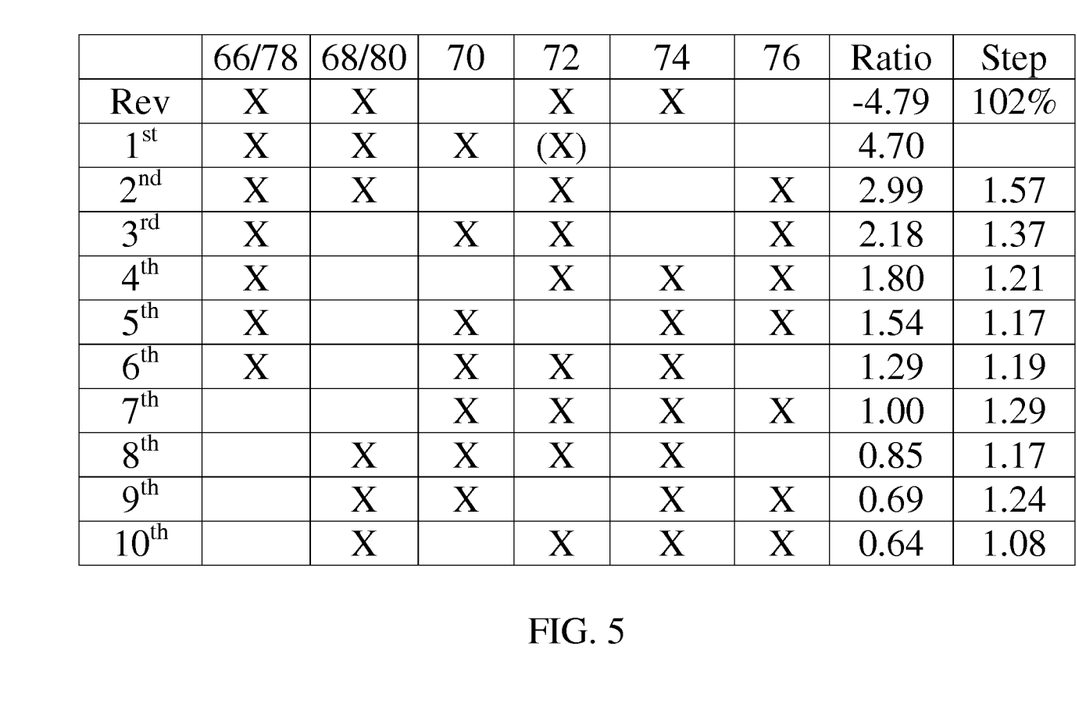
FIG. 5 is shift element application chart for the transmission gearing arrangement of FIG. 4.

As shown in FIG. 5, engaging the clutches and brakes in combinations of four establishes ten forward speed ratios and one reverse speed ratio between input shaft 12 and output shaft 14. An X indicates that the clutch is required to establish the speed ratio. An (X) indicates the clutch can be applied but is not required. In 1$^{st}$ gear, either clutch 74 or clutch 76 can be applied instead of applying clutch 72 without changing the speed ratio. When the gear sets have tooth numbers as indicated in FIG. 2, the speed ratios have the values indicated in FIG. 5. Operation of the transmission of FIG. 4 is analogous to operation of the transmission of FIG. 1 as described above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   first, second, third, fourth, and fifth shafts;
   input and output shafts;
   a first gearing arrangement configured to fixedly impose a linear speed relationship among the first shaft, the second shaft, and the third shaft;
   a second gearing arrangement configured to fixedly impose a linear speed relationship among the first shaft, the input shaft, and the fourth shaft;
   a third gearing arrangement configured to selectively impose a linear speed relationship among the fourth shaft, the second shaft, and the fifth shaft;
   a fourth gearing arrangement configured to fixedly impose a linear speed relationship among the fifth shaft, the output shaft, and the second shaft;
   a dog clutch configured to selectively hold the third shaft against rotation;
   a brake configured to selectively hold the first shaft against rotation; and
   a first clutch configured to selectively couple the input shaft to the fifth shaft.

2. The transmission of claim 1 further comprising a one way clutch configured to passively restrain the third shaft from rotating in a reverse direction.

3. The transmission of claim 1 further comprising a one way clutch configured to passively restrain the first shaft from rotating in a reverse direction.

4. The transmission of claim 1 wherein the first gearing arrangement comprises:
   a sun gear fixedly coupled to the first shaft;
   a ring gear fixedly coupled to the third shaft;
   a carrier fixedly coupled to the second shaft; and
   a plurality of planet gears supported for rotation relative to the carrier and in continuous meshing engagement with the sun gear and the ring gear.

5. The transmission of claim 1 wherein the second gearing arrangement comprises:
   a sun gear fixedly coupled to the first shaft;
   a ring gear fixedly coupled to the fourth shaft;
   a carrier fixedly coupled to the input shaft; and
   a plurality of planet gears supported for rotation relative to the carrier and in continuous meshing engagement with the sun gear and the ring gear.

6. The transmission of claim 1 further comprising a second clutch configured to selectively operatively couple the fourth shaft to the fifth shaft.

7. The transmission of claim 6 wherein the third gearing arrangement comprises:
   a sun gear fixedly coupled to the fourth shaft;
   a ring gear fixedly coupled to the fifth shaft;
   a carrier;
   a plurality of planet gears supported for rotation relative to the carrier and in continuous meshing engagement with the sun gear and the ring gear; and
   a third clutch configured to selectively couple the second shaft to the carrier.

8. The transmission of claim 7 wherein the second clutch directly couples the fourth shaft to the carrier.

9. The transmission of claim 1 wherein the third gearing arrangement comprises:
   a sun gear fixedly coupled to the fourth shaft;
   a ring gear fixedly coupled to the fifth shaft;
   a carrier;
   a plurality of planet gears supported for rotation relative to the carrier and in continuous meshing engagement with the sun gear and the ring gear;
   an intermediate shaft;
   a second clutch configured to selectively couple the fourth shaft to the intermediate shaft;
   a third clutch configured to selectively couple the second shaft to the intermediate shaft; and
   a fourth clutch configured to selectively couple the carrier to the intermediate shaft.

10. The transmission of claim 1 wherein the fourth gearing arrangement comprises:
    a sun gear fixedly coupled to the fifth shaft;
    a ring gear fixedly coupled to the second shaft;
    a carrier fixedly coupled to the output shaft; and
    a plurality of planet gears supported for rotation relative to the carrier and in continuous meshing engagement with the sun gear and the ring gear.

11. A transmission comprising:
    a housing;
    first, second, third, fourth, fifth, and sixth shafts;
    input and output shafts;
    a first gearing arrangement configured to fixedly impose a linear speed relationship among the first shaft, the second shaft, and the third shaft;
    a second gearing arrangement configured to fixedly impose a linear speed relationship among the first shaft, the input shaft, and the fourth shaft;
    a third gearing arrangement configured to fixedly impose a linear speed relationship among the fourth shaft, the sixth shaft, and the fifth shaft;
    a fourth gearing arrangement configured to fixedly impose a linear speed relationship among the fifth shaft, the output shaft, and the second shaft;
    a positive engagement shift element configured to selectively couple the third shaft to the housing;

a brake configured to selectively couple the first shaft to the housing;
a first clutch configured to selectively couple the input shaft to the fifth shaft; and
a clutch module configured to selectively couple any two of the second shaft, the fourth shaft, and the sixth shaft to one another.

12. The transmission of claim 11 wherein the positive engagement shift element is a dog clutch.

13. The transmission of claim 12 further comprising a one way clutch configured to passively restrain the third shaft from rotating in a reverse direction with respect to the housing.

14. The transmission of claim 11 further comprising a one way clutch configured to passively restrain the first shaft from rotating in a reverse direction with respect to the housing.

15. The transmission of claim 11 wherein the clutch module comprises:
an intermediate shaft;
a second clutch configured to selectively couple the fourth shaft to the intermediate shaft;
a third clutch configured to selectively couple the second shaft to the intermediate shaft; and
a fourth clutch configured to selectively couple the sixth shaft to the intermediate shaft.

16. A transmission comprising:
input, output, and intermediate shafts;
a first simple planetary gear set having a first sun gear, a first ring gear, and a first carrier;
a second simple planetary gear set having a second sun gear fixedly coupled to the first sun gear, a second ring gear, and a second carrier fixedly coupled to the input shaft;
a third simple planetary gear set having a third sun gear fixedly coupled to the second ring gear, a third ring gear, and a third carrier;
a fourth simple planetary gear set having a fourth sun gear fixedly coupled to the third ring gear, a fourth ring gear fixedly coupled to the first carrier, and a fourth carrier fixedly coupled to the output shaft;
a first clutch configured to selectively couple the intermediate shaft to the third carrier; and
a second clutch configured to selectively couple the intermediate shaft to the first carrier and fourth ring gear.

17. The transmission of claim 16 further comprising a third clutch configured to selectively couple the intermediate shaft to the second ring gear and third sun gear.

18. The transmission of claim 17 further comprising a fourth clutch configured to selectively couple the input shaft to the third ring gear and fourth sun gear.

19. The transmission of claim 18 further comprising a first brake configured to selectively hold the first sun gear and second sun gear against rotation.

20. The transmission of claim 19 further comprising a first one way clutch configured to passively restrain the first sun gear and second sun gear from rotation in a reverse direction.

21. The transmission of claim 16 further comprising a positive engagement shift element configured to selectively hold the first ring gear against rotation.

22. The transmission of claim 21 wherein the positive engagement shift element is a dog clutch.

23. The transmission of claim 22 further comprising a second one way clutch configured to passively restrain the first ring gear from rotation in a reverse direction.

24. A transmission comprising:
four simple planetary gear sets having first through fourth suns, first through fourth rings, and first through fourth carriers, respectively, wherein
the third carrier is selectively coupled to an intermediate shaft,
the fourth ring is fixedly coupled to the first carrier and selectively coupled to the intermediate shaft, and
the second ring is fixedly coupled to the third sun and selectively coupled to the intermediate shaft.

25. The transmission of claim 24 wherein:
the second sun is fixedly coupled to the first sun;
the second carrier is fixedly coupled to an input;
the third sun is fixedly coupled to the second ring;
the fourth sun is fixedly coupled to the third ring; and
the fourth carrier is fixedly coupled to an output.

* * * * *